United States Patent
Huang et al.

(10) Patent No.: US 6,286,200 B1
(45) Date of Patent: Sep. 11, 2001

(54) DUAL MASK PROCESS FOR MAKING SECOND POLE PIECE LAYER OF WRITE HEAD WITH HIGH RESOLUTION NARROW TRACK WIDTH SECOND POLE TIP

(75) Inventors: Bin Huang, Fremont; Edward Hinpong Lee, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,863

(22) Filed: Jul. 23, 1999

(51) Int. Cl.[7] .............................. G11B 5/127; G03C 5/56
(52) U.S. Cl. .................................. 29/603.12; 29/603.08; 29/603.18; 430/312; 430/319; 360/318
(58) Field of Search ........................ 29/603.08, 603.12, 29/603.15, 603.16, 603.18; 430/312, 315, 319; 360/318, 314, 281.5

(56) References Cited

U.S. PATENT DOCUMENTS

| 5,508,867 | 4/1996 | Cain et al. |
|---|---|---|
| 5,701,223 | 12/1997 | Fontana, Jr. et al. |
| 5,718,035 | * 2/1998 | Yamanaka et al. ............ 29/603.12 |
| 5,741,624 | * 4/1998 | Jeng et al. ......................... 430/312 |
| 5,789,140 | * 8/1998 | Chou et al. ....................... 430/315 |
| 6,042,975 | * 3/2000 | Burm et al. ....................... 430/312 |

FOREIGN PATENT DOCUMENTS

| 60-86543 | * 5/1985 | (JP) | ............................ 430/312 |
|---|---|---|---|
| 2-238457 | * 9/1990 | (JP) | ............................ 430/312 |

* cited by examiner

Primary Examiner—Lee Young
Assistant Examiner—A. Dexter Tugbang
(74) Attorney, Agent, or Firm—Gray Cary Ware & Freidenrich; Ervin F. Johnston (57) ABSTRACT

A method of making a second pole piece layer that has a yoke portion between a pole tip portion and a back gap portion comprising the steps of forming a first photoresist layer that is sensitive to a first bandwidth of light, forming a second photoresist layer on the first photoresist layer that is sensitive to a second bandwidth of light that is different from the first bandwidth of light, after forming the first and second photoresist layers, photopatterning the second photoresist layer with the second bandwidth of light to provide an opening at pole tip, yoke and back gap sites wherein the pole tip, yoke and back gap sites define perimeters for the pole tip, yoke and back gap portions respectively, after photopatterning the second photoresist layer, photopatterning the first photoresist layer with the first bandwidth of light to provide openings at the pole tip, yoke and back gap sites and then plating the pole tip, yoke and back gap portions of the second pole piece layer in the openings of the first and second photoresist layers.

19 Claims, 10 Drawing Sheets

LIGHT EXPOSE FIRST PHOTORESIST LAYER (PR1) AND DEVELOP

DUAL MASK PROCESS FOR MAKING SECOND POLE PIECE LAYER OF WRITE HEAD WITH HIGH RESOLUTION NARROW TRACK WIDTH SECOND POLE TIP

BACKGROUND OF THE INVENTION

1. Field of the Invention

The present invention relates to a dual mask process for making a second pole piece layer of a write head with a high resolution narrow track width second pole tip and more particularly to first and second photoresists masks that are photopatterned separately so that the first photoresist mask masking the second pole tip is thin for promoting high resolution of the second pole tip with a narrow track.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field writes field signals in the form of magnetic bits of information in tracks on moving media, such as in circular tracks on a rotating disk.

The read head senses the field signals as the disk rotates. This is typically accomplished by a sensor that changes resistance proportional to the magnetic field imposed on the sensor by the magnetic bits of information. A sense current is conducted through the sensor and the resistance changes in the sense current circuit are processed by processing circuitry as playback signals. First and second leads are connected to the sensor for conducting the sense current therethrough. The sensor and the first and second leads are located between first and second read gap layers and the first and second gap layers are located between first and second shield layers.

Multiple magnetic head assemblies are constructed in rows and columns on a wafer by various thin film deposition-techniques. After constructing the magnetic head assemblies on the wafer, the wafer is diced into rows of magnetic head assemblies and lapped in order to form each magnetic head assembly with an air bearing surface. The row of magnetic head assemblies is then diced into individual magnetic head assemblies and one or more magnetic head assemblies is mounted in a magnetic disk drive. The metallic components of the read and write head of each magnetic head assembly, except for the metallic components of the read sensor, are typically constructed by what is known in the art as frame plating. Frame plating comprises sputter depositing a seed layer on the wafer, spinning a layer of photoresist on the seed layer, light exposing the photoresist layer in areas which are to be removed, assuming the photoresist is a positive photoresist, developing the photoresist to remove the light exposed portions of the photoresist layer leaving an opening where the metallic component is to be formed, electroplating the metallic component into the opening using the seed layer as an electrical return path, and then removing the photoresist layer. This process is also referred to in the art as photolithography patterning or photo patterning.

The first and second shield layers of the read head are typically formed by frame plating or by sputter deposition. After construction of the second shield layer the second shield layer is employed as a first pole piece layer for the write head or a dielectric isolation layer is formed on top of the second shield layer followed by construction of the first pole piece layer by frame plating on the isolation layer. When the second shield layer is employed as the first pole piece layer the magnetic head assembly is referred to as a merged magnetic head whereas when the isolation layer is employed the magnetic head assembly is referred to as a piggyback head. The second shield/first pole piece layer or first pole piece layer has a yoke region which is located between a pole tip region and a back gap region. The pole tip region is defined between the air bearing surface and the location where the second pole piece layer first commences to widen after the air bearing surface. After constructing the first pole piece layer the write gap layer is sputter deposited on the pole tip portion of the first pole piece layer.

Either before or after construction of the write gap layer an insulation stack with one or more coils embedded therein is constructed on the yoke region of the first pole piece layer. Each insulation layer of the insulation stack is typically constructed by spinning a layer of photoresist on the wafer, exposing the photoresist layer to light in regions that are to be removed, developing the photoresist layer to remove the light exposed portions and then baking the photoresist layer at a high temperature until it hardens. The edges of the baked photoresist layer are typically rounded or curved by this process and the curved edge facing the air bearing surface is quantified by an aspect angle $\theta$ where $\theta$ is the angle that the forward edge of the baked photoresist layer makes with a horizontal. After constructing the first insulation layer, the write coil layer is frame plated thereon followed by construction of a second photoresist layer on the write coil layer. In some write heads, a second write coil layer is then frame plated on the second insulation layer followed by construction of a third and, optionally, a fourth photoresist insulation layer on the second write coil layer. It can be visualized that the construction of the insulation stack, whether it includes one or two coils, results in a high profile insulation stack close to the air bearing surface where a second pole tip of the second pole piece layer is to be constructed.

The second pole piece layer is also constructed by frame plating. A photoresist layer is spun on the wafer on top of the insulation stack as well as on top of the write gap layer between the insulation stack and the air bearing surface. During the spinning process the photoresist layer planarizes across the wafer causing the photoresist to be very thick in the pole tip region between the curved forward edge of the insulation stack and the air bearing surface and somewhat thinner on top of the insulation stack. It is necessary that the photoresist have a sufficient thickness on top of the insulation stack in order to frame plate the yoke portion of the second pole piece layer. Assuming a thickness of 3.5 $\mu$m for the yoke portion of the second pole piece layer, the thickness of the photoresist on top of the insulation stack should be approximately 4.0 $\mu$m. This can result in the thickness of the photoresist layer between the insulation stack and the ABS of 8 $\mu$m to 12 $\mu$m. Unfortunately, this thickness does not permit constructing a second pole tip with high resolution and a narrow track.

Efforts continue to construct high resolution second pole tips with a submicron track. By decreasing the track width of the second pole tip the magnetic storage capability or capacity of the magnetic disk drive is increased. These kinds of efforts have increased the storage capacity of computers from kilobytes to megabytes to gigabytes. Since the second pole tip may also be only 3.5 $\mu$m in height the light exposure step in the frame plating of the second pole piece layer must penetrate 5 to 8 $\mu$m in the photoresist layer in the pole tip region before the light exposure step light exposes the second pole tip site where the second pole tip is to be frame plated. As the light penetrates the photoresist layer in the pole tip region it disperses laterally in the same manner as light disperses in a column of water. This provides poor definition for the side walls of the second pole tip which defines the track width. Accordingly, the thick photoresist layer portion in the pole tip region can result in irregularly shaped side walls which are not precisely formed. Another problem that can occur is reflective notching by the light during the light exposure step. The seed layer sputter deposited on the wafer becomes a light reflector on the insulation stack. When the light is directed downwardly for light exposing the site where the second pole tip is to be formed, light is reflected from the sloping surfaces of the forward portion of the insulation stack into regions laterally adjacent the first and second side wall sites of the second pole tip causing a notching of the photoresist layer beyond the first and second side walls after the photoresist layer is developed. This causes the second pole tip to be frame plated with irregularly shaped first and second side walls which extend beyond the desired track width of the second pole tip. Accordingly, there is a strong felt need to provide an improved photo process for constructing a narrow second pole tip with high resolution.

SUMMARY OF THE INVENTION

The present invention employs first and second photoresist layers for frame plating the second pole piece layer wherein only the first photoresist layer provides a frame for the second pole tip and the first and second photoresist layers provide a frame for the yoke portion of the second pole piece layer. The first photoresist layer is sensitive to only a first bandwidth of light while the second photoresist layer is sensitive to a second bandwidth of light which is different from the first bandwidth of light. After forming the first photoresist layer on the wafer the second photoresist layer is formed on top of the first photoresist layer. At this point there has been no light exposure of either of the photoresist layers. The second photoresist layer is then exposed to the second bandwidth of light. Only the second photoresist layer will be affected by this light exposure step. Light exposure of the second photoresist layer is in the yoke and back gap regions of the second pole piece layer as well as at least the pole tip region and preferably laterally beyond the pole tip region forward of the insulation stack. After developing the second photoresist layer the second photoresist layer has an opening in the yoke, back gap and pole tip regions. The first photoresist layer is then light exposed in the yoke, back gap and pole tip regions in the second bandwidth of light. After developing the first photoresist layer the first photoresist layer has an opening coinciding with the yoke and back gap opening of the second photoresist layer and an opening in the pole tip region where the second pole tip is to be formed.

By employing first and second photoresist layers as described hereinabove the first photoresist layer can be much thinner in the pole tip region than the prior art single photoresist layer employed for frame plating the second pole piece layer. For example, with a second pole tip having a plated height of 3.5 $\mu$m the thickness of the first photoresist layer in the pole tip region may be approximately 4.0 $\mu$m. Accordingly, light penetrating the first photoresist layer in the pole tip region will have considerably less dispersion in the first photoresist layer, thereby improving the track width and resolution of the second pole tip. After the first and second photoresist layers are patterned with their openings the second pole piece layer is frame plated in the openings, the first and second photoresist layers are removed and then exposed portions of the seed layer are removed by sputter etching. In a specific example, the first photoresist layer may be significantly sensitive to only light at or below 420 nanometers in wave length and the second resist layer might be sensitive to light at or below 470 nanometers. Accordingly, the second photoresist layer is exposed to light having wavelengths at least between 420 and 470 nanometers.

It should be understood that the second pole tip determines the track density of the write head since the second pole tip is the last component of the write head to pass by the track on a rotating magnetic disk. Accordingly, the width between its first and second side walls is the track width of the write head and determines the number of tracks that can be written on the rotating magnetic disk. Track width is quantified as tracks per inch (TPI) which, in combination with the number of magnetic bits being written linearly along the track, determines what is known in the art as areal density which is quantified as bits per square inch of the magnetic disk. Efforts over the years to increase the areal density have increased the storage capacity of computers from kilobytes to megabytes to gigabytes. Accordingly, much attention is given to constructing second pole tips that are narrow and well-defined.

An object of the present invention is to improve the track width and resolution of second pole tips constructed by frame plating techniques.

Another object is to reduce the light dispersion during a light exposure step in photopatterning a second pole tip so as to promote a more well-defined second pole tip with a narrow track width.

Other objects and advantages of the present invention will become apparent upon reading the following description taken together with the accompanying drawings.

DESCRIPTION OF THE PREFERRED EMBODIMENTS

Magnetic Disk Drive

Figure 1:
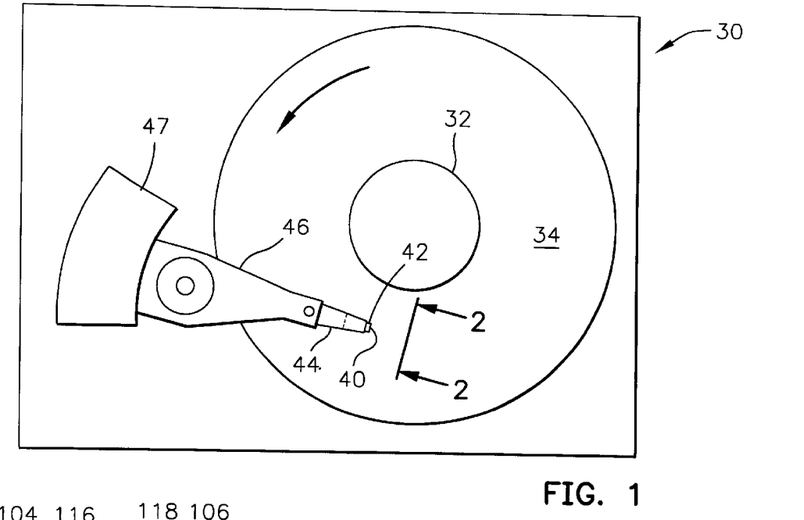
FIG. 1 is a plan view of an exemplary magnetic disk drive.
Figures 2, 3:
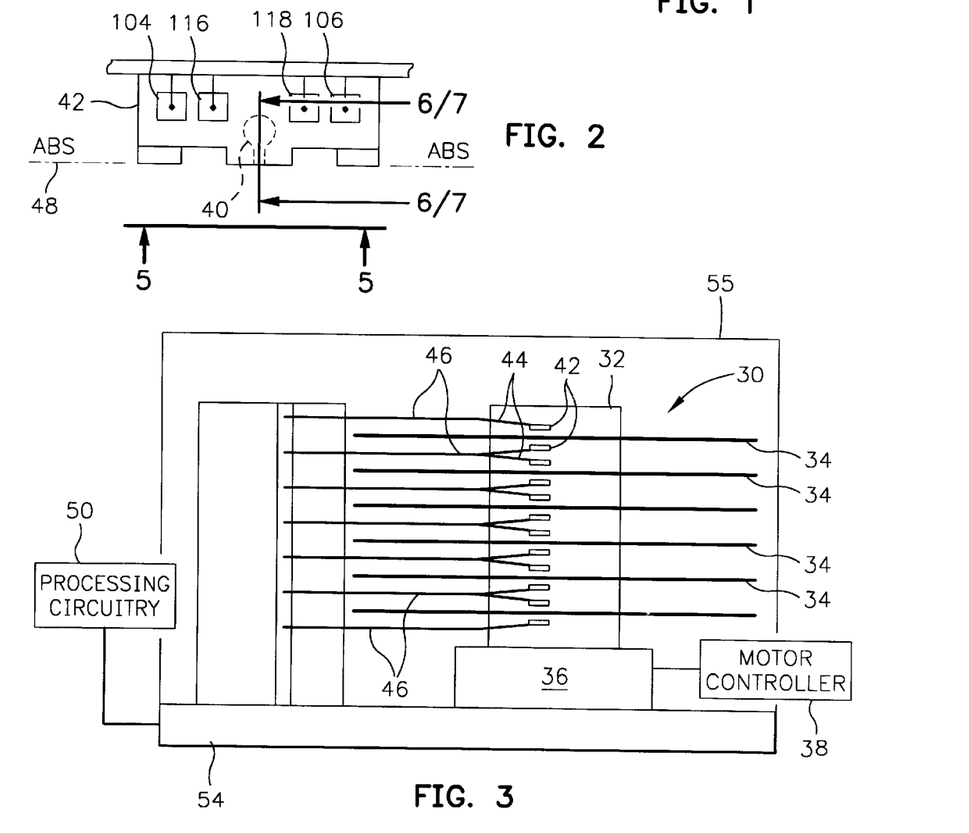
FIG. 2 is an end view of a slider with a magnetic head of the disk drive as seen in plane 2—2.
FIG. 3 is an elevation view of the magnetic disk drive wherein multiple disks and magnetic heads are employed.
Figure 4:
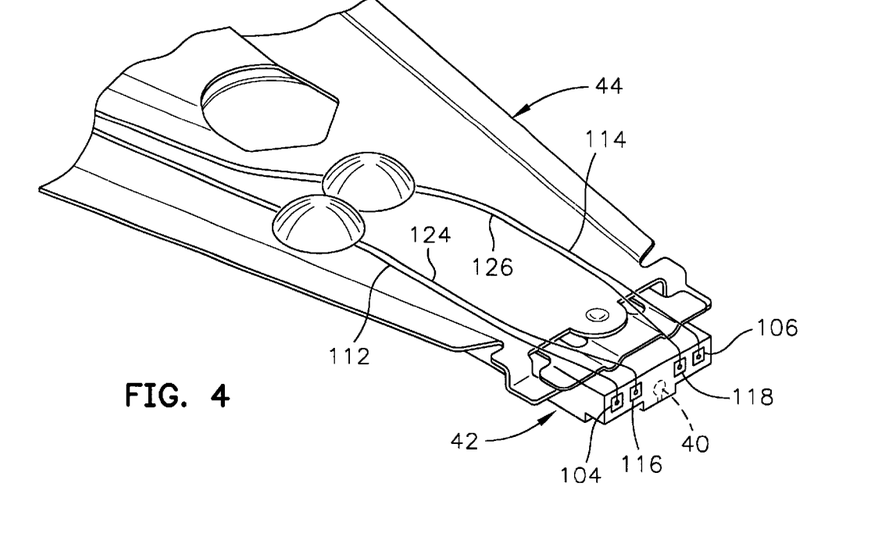
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A combined read and write magnetic head 40 is mounted on a slider 42 that is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing, as shown in FIG. 3.

Figure 5:
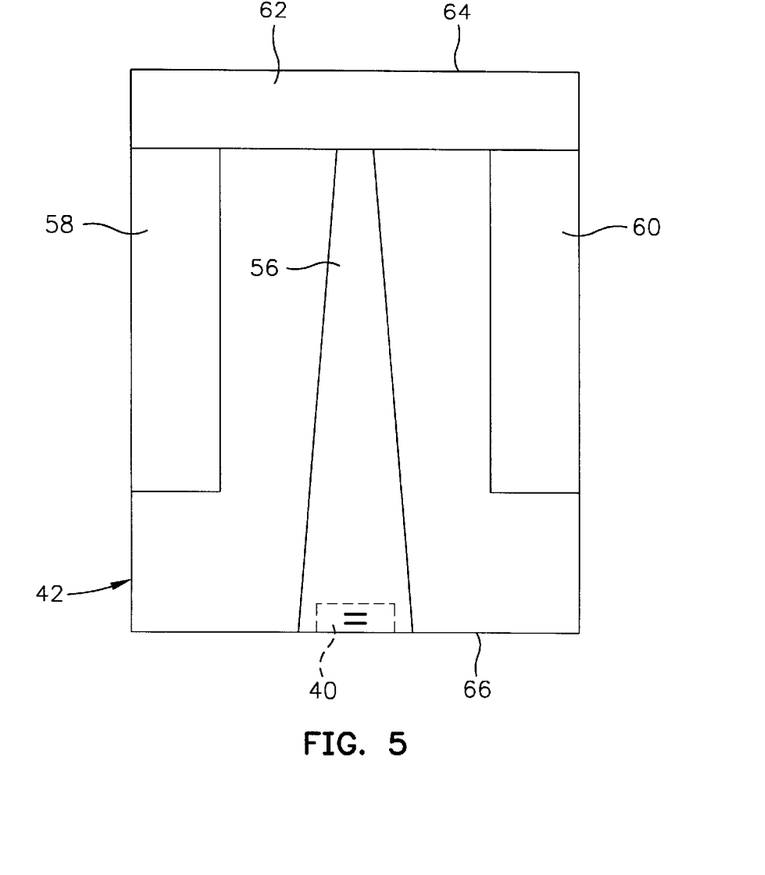
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
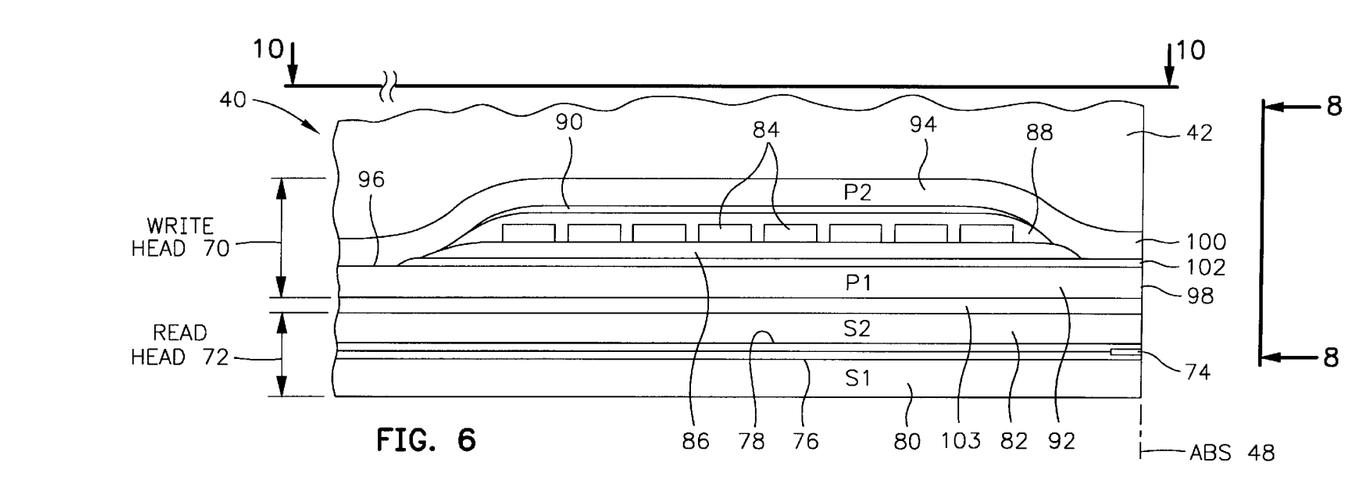
FIG. 6 is a partial view of the slider and a piggyback magnetic head as seen in plane 6—6 of FIG. 2.
Figure 8:
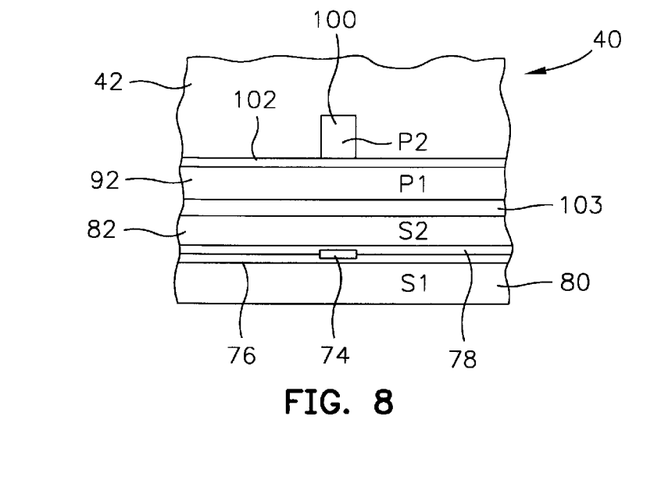
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing an AP pinned spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may optionally be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 7:
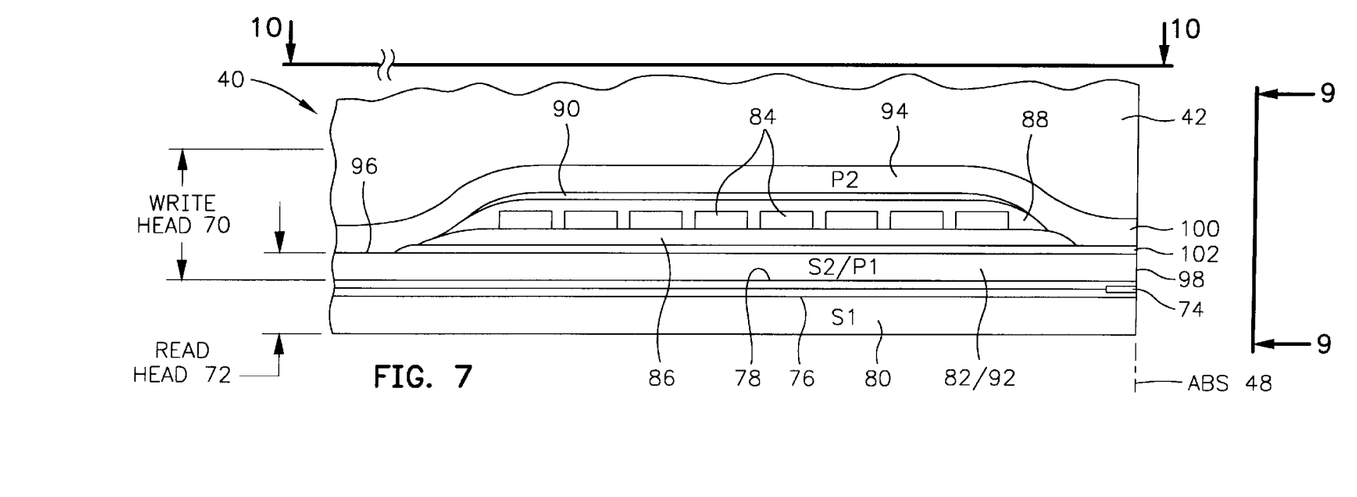
FIG. 7 is a partial view of the slider and a merged magnetic head as seen in plane 7—7 of FIG. 2.
Figure 9:
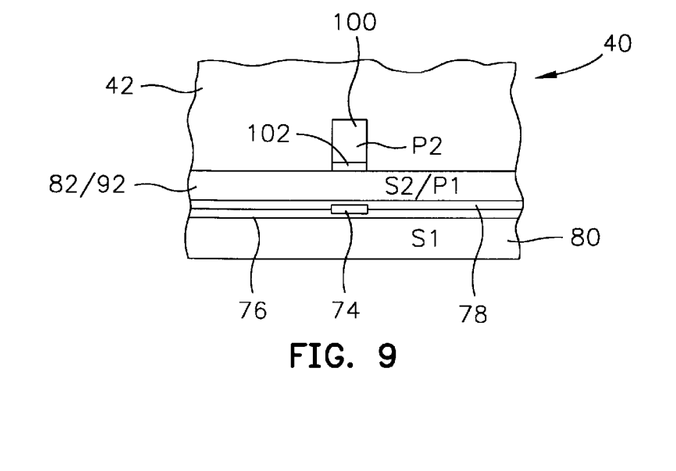
FIG. 9 is a partial ABS view of the slider taken along plane 9—9 of FIG. 7 to show the read and write elements of the merged magnetic head.
Figure 10:
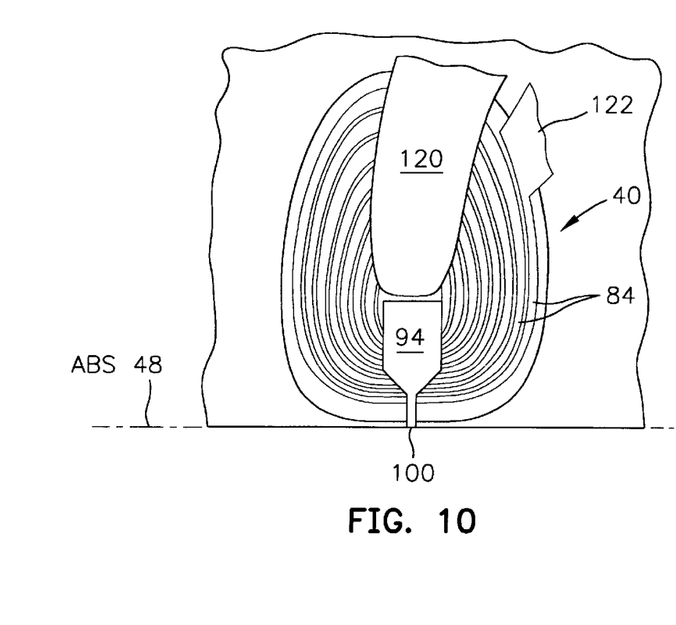
FIG. 10 is a view taken along plane 10—10 of FIGS. 6 or 7 with all material above the coil layer and leads removed.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Before construction of the second pole piece layer 94 in either of the embodiments shown in FIGS. 6 and 7, a photoresist layer is spun on top of the insulation stack and the write coil 84. Since photoresist planarizes itself across a wafer when it is spun thereon the thickness of the photoresist will be significantly greater in a pole tip region between sloping forward portions of the insulation stack and the ABS 48. During the light exposure step light penetrates the increased thickness in the pole tip region and disperses causing irregular shaped first and second side walls of the second pole tip which are invariably wider than a desired track width. The purpose of the present invention is to provide an improved frame plating process for constructing a more narrow and well-defined second pole tip.

The Invention

Figure 11:
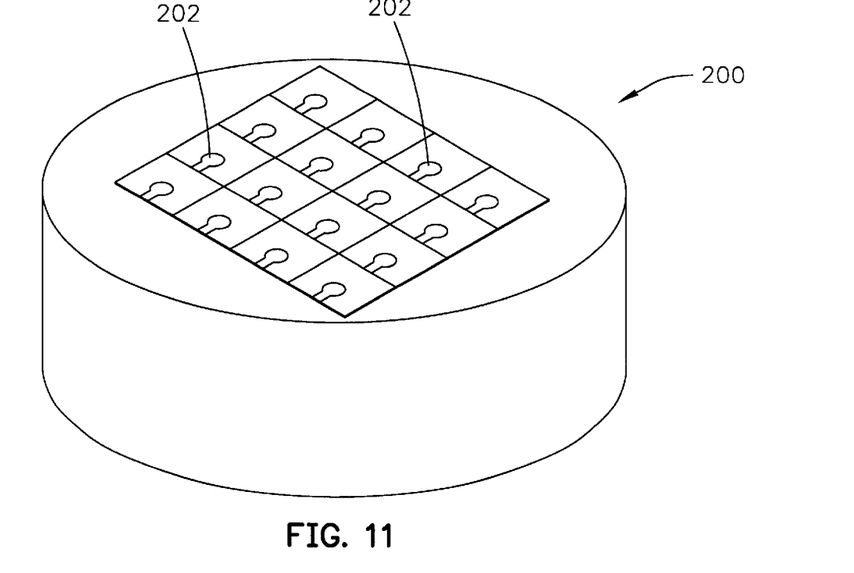
FIG. 11 is an isometric illustration of a wafer upon which rows and columns of magnetic head assemblies are being constructed.
Figure 12:
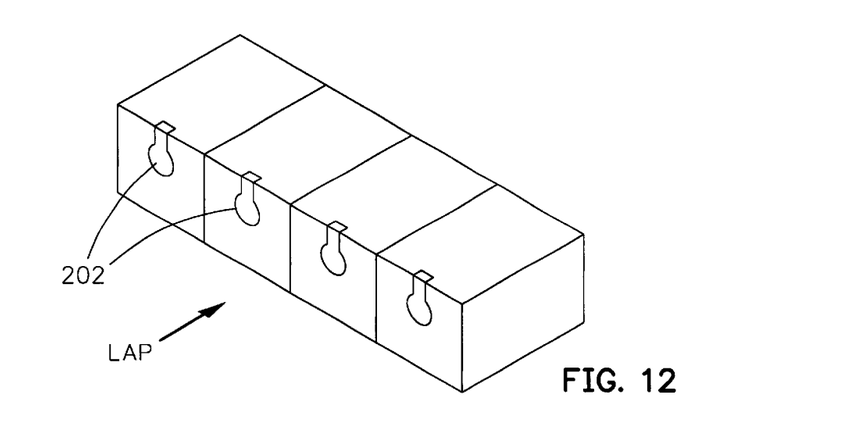
FIG. 12 is a row of magnetic head assemblies being lapped to form the air bearing surface.
Figure 13:
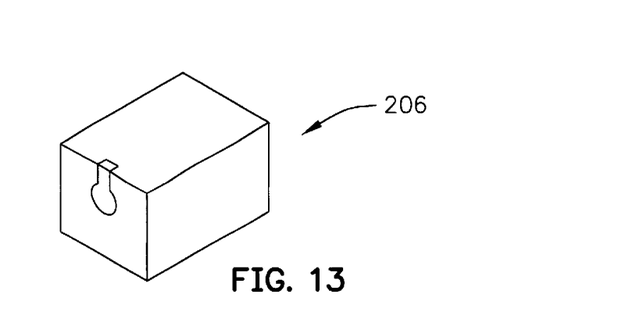
FIG. 13 is an individual magnetic head assembly after the row of magnetic head assemblies in FIG. 12 have been diced.

FIG. 11 shows an isometric illustration of a wafer 200 which has rows and columns of magnetic head assemblies 202. After construction, each magnetic head assembly has a cross-section, as illustrated in FIGS. 6 or 7. After constructing the magnetic head assemblies 202 on the wafer 200, the wafer is diced into rows of magnetic head assemblies, one row of magnetic head assemblies 204 being illustrated in FIG. 12. Each row of magnetic head assemblies is lapped to form each magnetic head assembly with an air bearing surface, as discussed hereinabove. The rows of magnetic head assemblies are then diced into individual magnetic head assemblies, as shown by one such assembly 206 in FIG. 13. One or more magnetic head assemblies is then mounted on a magnetic disk drive, such that as shown in FIG. 3 where multiple magnetic head assemblies 42 are mounted.

FIGS. 14-23 illustrate various steps in the present method of frame plating the second pole piece layer of the write head. The merged magnetic head shown in FIG. 7 will be used as an example. After constructing the read head portion, which includes S1 and S2/P1, the write gap layer 102, the first insulation layer 86, the write coil layer 84, the second insulation layer 88 and, optionally, a third insulation layer 90 as shown in FIG. 7 are formed on the read head. The insulation layer 88 has a forward sloping surface 208 which faces an ABS site 48. The partially completed head is now ready for frame plating of the second pole piece layer.

Figure 14:
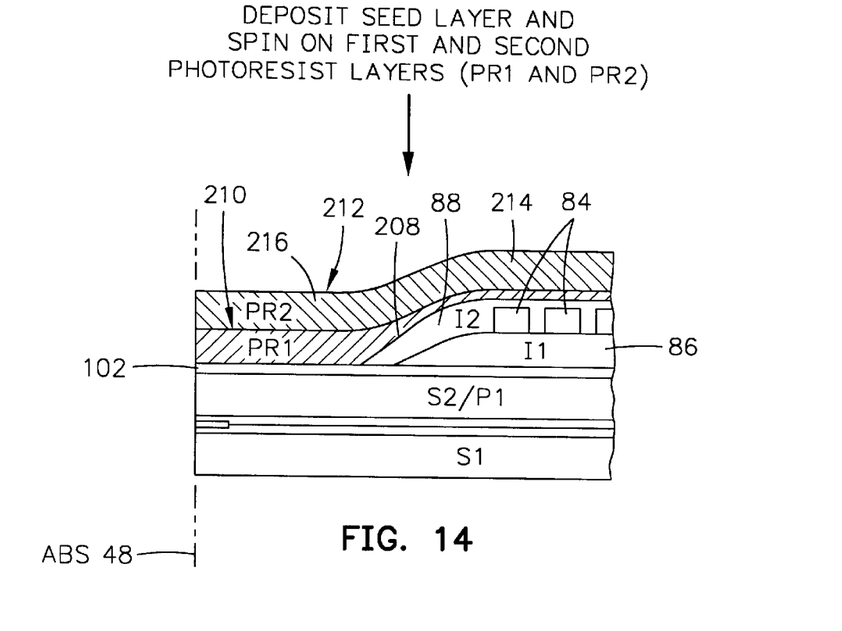
FIG. 14 is a longitudinal cross-sectional view of a front portion of a magnetic head assembly after forming first and second photoresist layers for constructing the second pole piece layer.
Figure 15:
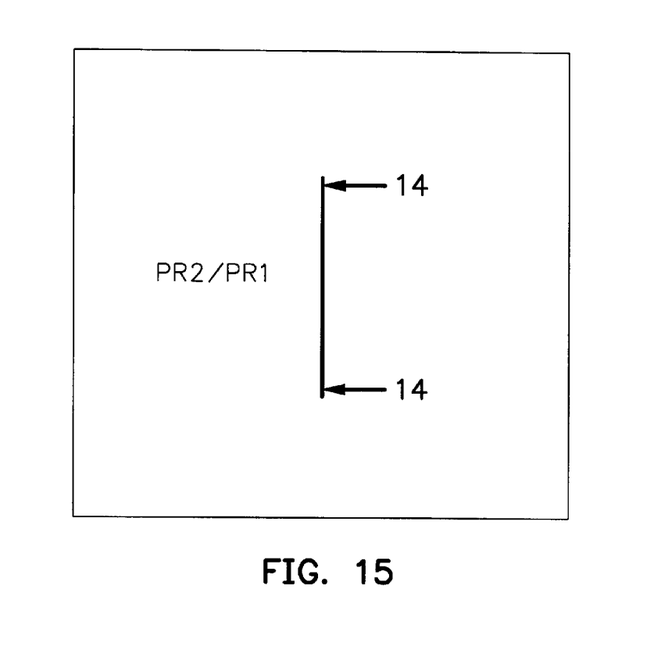
FIG. 15 is a top view of FIG. 14.

As shown in FIG. 14, a seed layer (not shown) is formed on the wafer followed by formation of first and second photoresist layers (PR1) 210 and (PR2) 212. Since the first photoresist layer 210 planarizes across the wafer, it is very thin on top of the insulation stack and thicker in the pole tip region forward of the insulation stack. The second photoresist layer 212 also planarizes across the wafer with a thickness in a yoke region of the head where a yoke portion of the second pole piece layer is to be plated. As will be explained hereinafter, the thickness 216 of the second photoresist layer in the pole tip region will have no effect on the resolution and definition of the second pole tip portion of the second pole piece layer after it is frame plated. FIG. 15 is a top view of FIG. 14 and FIG. 14 is a cross section along line 14—14 in FIG. 15. In a preferred embodiment of the invention the second photoresist layer 212 is thicker in the pole tip region then the first photoresist layer 210.

The first and second photoresist layers are sensitive to light in different bandwidths. It is important that the light exposure step of the second photoresist layer 212, which will be discussed hereinafter, not affect the first photoresist layer 210. As an example, the first photoresist layer 210 may be sensitive to light with wavelengths at or below 420 nm while the second photoresist layer 212 is sensitive to light with wavelengths above 420 nm. An exemplary bottom or first photoresist 210 is AZ 9245 photoresist and an exemplary second or top photoresist 212 may be AZ P4620 photoresist made and obtainable from Hoechst Celanese Corporation in Somerville, N.J. 08876-1258. AZ 9245 photoresist is composed of 62% propylene glycol monomethyl ether acetate, 30.4% formaldehyde-dimethylphenol-3-methylphenol-4-methylphenol polymer and 7.6% ar'-isopropyl (1,1'-biphenyl)-4-yl 3-diazo-3,4-dihydro-4-oxonaphthalene-1-sulphonate. The AZ P4620 photoresist is composed of 59% propylene glycol monomethyl ether acetate, PMA, 1-methoxy-2-propyl acetate and 41% cresol novolak resin 117520-84-0 which contains diazonaphthoquinone sulfonic acid esters. The AZ 9245 resist is sensitive only to light with wavelengths at and below 420 nm while the AZ P4620 photoresist is sensitive to a broader band of light which includes light with wavelengths above 420 nm. as well as light having wavelengths at and below 420 nm. It should be understood that the first and second photoresists 210 and 212 described herein are merely exemplary and that other photoresists may be employed where the photoresists are sensitive to different bandwidths of light.

Figure 16:
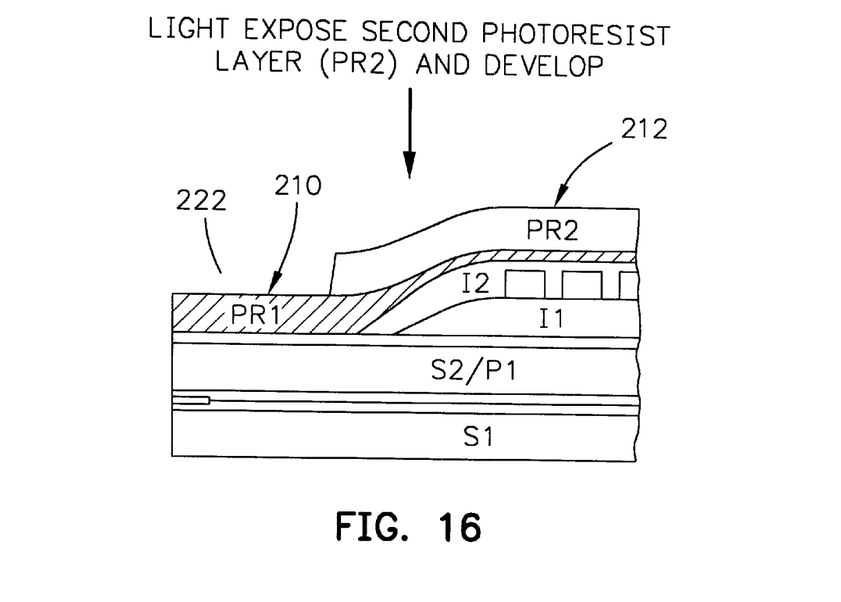
FIG. 16 is the same as FIG. 14 except the second photoresist layer has been light exposed and developed so as to pattern it with an opening.
Figure 17:
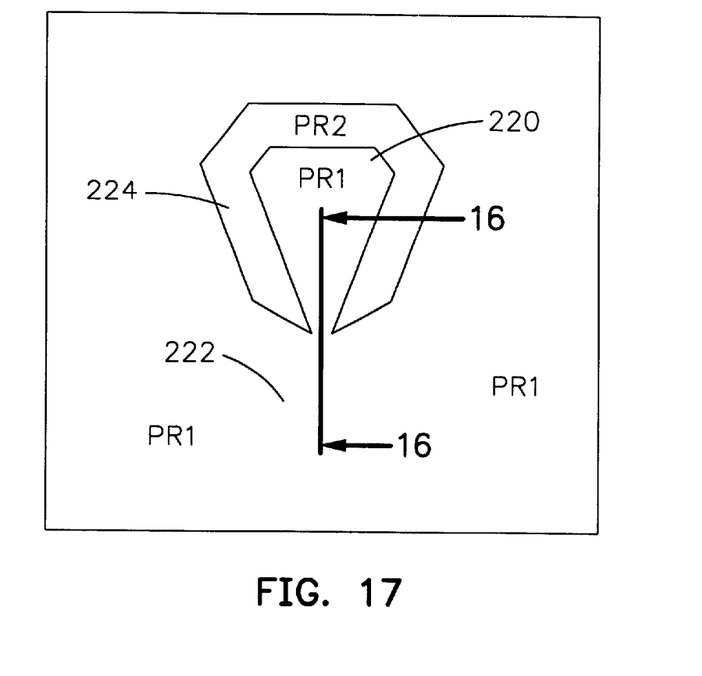
FIG. 17 is a top view of FIG. 16.
Figure 18:
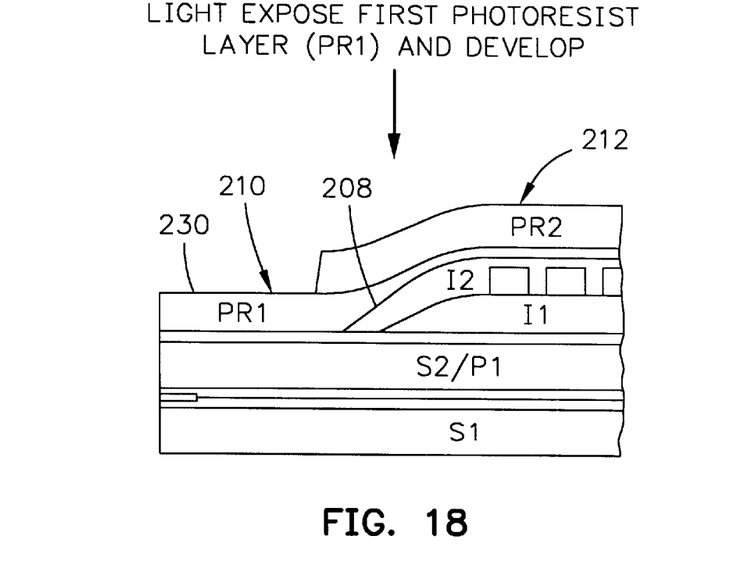
FIG. 18 is the same as FIG. 16 except the first photoresist layer has been light exposed and developed to provide an opening where the second pole tip is to be constructed.
Figure 19:
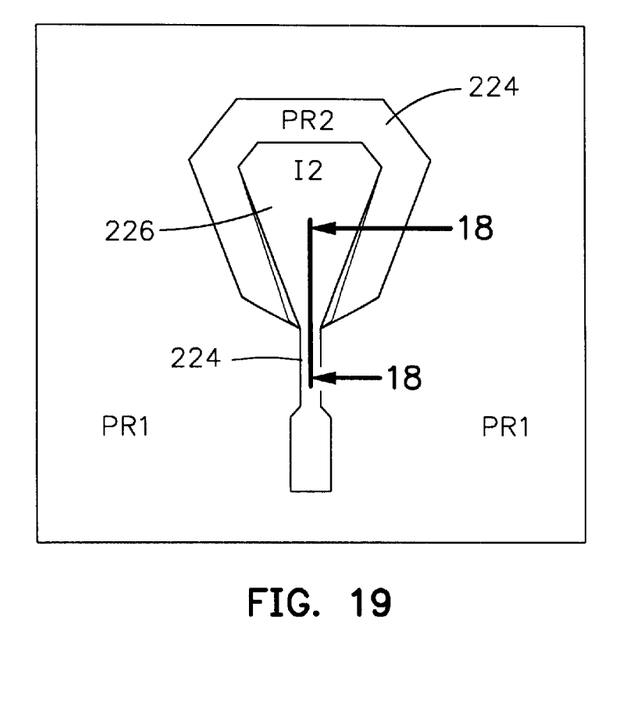
FIG. 19 is a top view of FIG. 18.

FIG. 16 is the same as FIG. 14 except the second photoresist layer 212 has been exposed to light in regions that are to be removed and developed causing a desired opening in the second photoresist layer 220, as shown in FIG. 17, for the yoke and back gap portions of the second pole piece layer. FIG. 16 is a cross section taken along line 16—16 in FIG. 17. The second photoresist layer has also been light exposed and developed to provide an opening 222 in the pole tip region which preferably opens up the second photoresist layer beyond the second pole tip region and encompasses the remaining second photoresist layer to provide a U-shaped frame 224, as shown in FIG. 17. The light exposure of the second photoresist layer 212 excludes light that would change the molecular structure of the first photoresist layer 210. For instance, if the first photoresist layer is sensitive to light with wavelengths of 420 nm or less a 420 nm filter should be employed to filter the light directed into the second photoresist layer 212. It can be seen from FIG. 17 that the light exposure and developing of the second photoresist layer has not affected the first photoresist layer (PR1) which is shown within and about the second photoresist frame 224. Next, as shown in FIG. 18, the first photoresist layer 210 is exposed to light which has wavelengths at and below 420 nm and optionally at and above 420 nm, and the first photoresist layer (PR1) is then developed to provide an opening having a region 224 defining the second pole tip and a region 226 defining the yoke and back gap portions of the second pole piece layer. FIG. 18 is a cross section taken along line 18—18 in FIG. 19. The opening 226 in the first photoresist layer coincides with the opening in the first photoresist frame 224 so that contiguous side walls of the first and second photoresist layers in the yoke and back gap regions provide a form for the yoke and back gap portions of the second pole piece layer during electroplating. Since the thickness of a portion 230 (See FIG. 18) of the first photoresist layer in the pole tip region is significantly less than prior art thicknesses in this region the light exposure step in this region has less dispersion in the first photoresist layer so that a narrow track width and high resolution second pole tip can be electroplated, as discussed hereinafter. Further, since the region 230 of the first photoresist layer is thinner less light intensity can be employed in the light exposure step which results in less light reflected from a seed layer on the curved portion 208 of the insulation stack that faces the ABS which, in turn, results in less reflective notching. It should be understood that the light exposure step of the first photoresist layer 210 may include light having wavelengths above 440 nm. without affecting the second photoresist frame 224, since the light imaging is not directed into the second photoresist frame 224 during this step.

Figure 20:
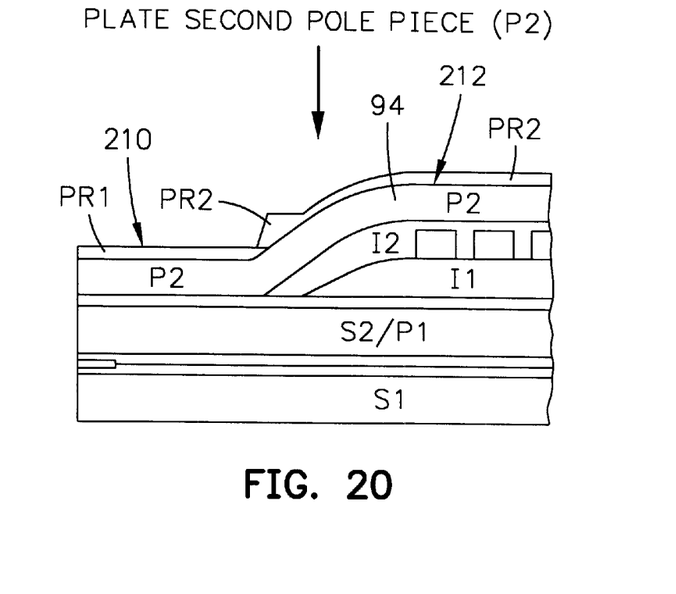
FIG. 20 is the same as FIG. 18 except the second pole piece layer has been frame plated.
Figure 21:
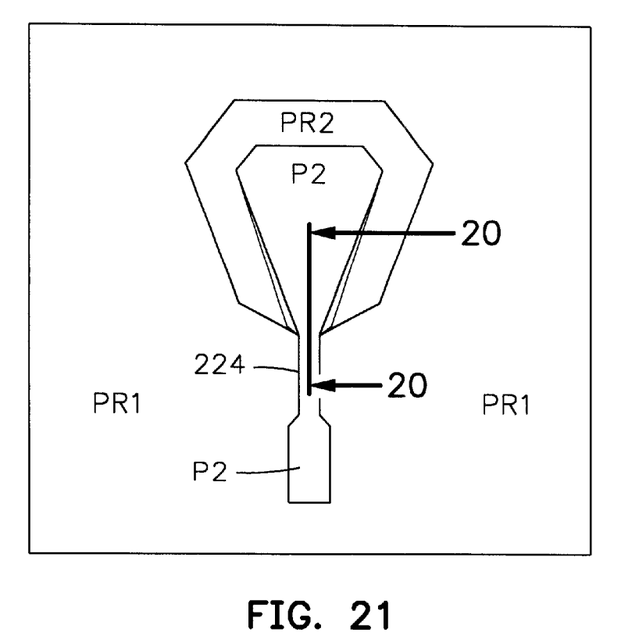
FIG. 21 is a top view of FIG. 20.
Figure 22:
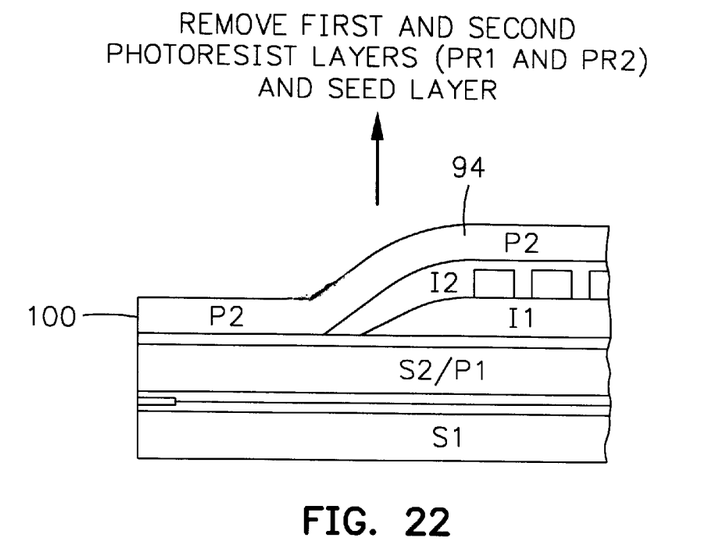
FIG. 22 is the same as FIG. 20 except the first and second photoresist layers have been removed.
Figure 23:
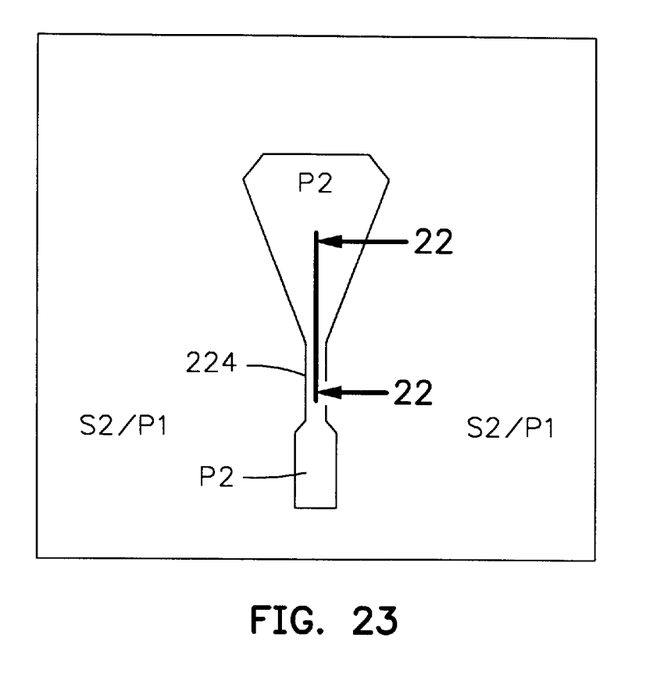
FIG. 23 is a top view of FIG. 22.

FIG. 20 is the same as FIG. 18 except the second pole piece 94 has been electroplated into the openings provided by the first and second photoresist layers 210 and 212. A top view of FIG. 20 is shown in FIG. 21 and FIG. 18 is a cross section along line 18—18 in FIG. 19. As shown in FIG. 22, the first and second photoresist layers 210 and 212 have been removed and exposed portions of the seed layer (not shown) have been removed by sputter etching leaving a partially completed head with the second pole piece layer 94 completed. A top view of FIG. 22 is shown in FIG. 23. Since the second pole tip 100 has been frame plated with a thinner resist layer its first and second side walls, which define the track width of the write head, can be constructed with high resolution.

Discussion

It should be understood that the invention can be practiced with any two photoresist layers which are sensitive to light having different bandwidths. For instance, the first photoresist layer 210 may be sensitive to light having wavelengths at or above a particular wavelength while the second photoresist layer 212 is sensitive to a broader bandwidth of light including the bandwidth of light for the first photoresist layer 210. In this instance the second photoresist layer 212 would be exposed to light at or below the particular wavelength and the first photoresist layer 210 would then be exposed to light at or above a particular wavelength and, optionally, inclusive of light having wavelengths below the particular wavelength. A salient characteristic of the first and second photoresist layers 210 and 212 is that the light exposure of the second photoresist layer 212 excludes light that changes the molecular structure of the first photoresist layer 210.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and the accompanying drawings.

We claim:

1. A method of making a magnetic write head that includes a second pole piece layer wherein the second pole piece layer has a yoke portion between a pole tip portion and a back gap portion comprising the steps of:
    a making of the second pole piece layer comprising the steps of:
        forming a first photoresist layer that is sensitive to a first bandwidth of light;
        forming a second photoresist layer on the first photoresist layer that is sensitive to a second bandwidth of light that is different from said first bandwidth of light;
        after forming the first and second photoresist layers, photopatterning the second photoresist layer with said second bandwidth of light to provide an opening at pole tip, yoke and back gap sites wherein the pole tip, yoke and back gap sites define perimeters for said pole tip, yoke and back gap portions respectively of the second pole piece layer;
        after photopatterning the second photoresist layer, photopatterning the first photoresist layer with said first bandwidth of light to provide openings at said pole tip, yoke and back gap sites; and
        plating the pole tip, yoke and back gap portions of the second pole piece layer in the openings of the first and second photoresist layers.

2. A method of making a magnetic write head that includes a second pole piece layer wherein the second pole piece layer has a yoke portion between a pole tip portion and a back gap portion comprising the steps of:
    a making of the second pole piece layer comprising the steps of:
        forming a first photoresist layer that is sensitive to a first bandwidth of light;
        forming a second photoresist layer on the first photoresist layer that is sensitive to a second bandwidth of light that is different from said first bandwidth of light;
        photopatterning the second photoresist layer with said second bandwidth of light to provide an opening at pole tip, yoke and back gap sites wherein the pole tip, yoke and back gap sites define areas for said pole tip, yoke and back gap portions respectively of the second pole piece layer;
        photopatterning the first photoresist layer with said first bandwidth of light to provide an opening at said pole tip, yoke and back gap sites;
        plating the pole tip, yoke and back gap portions of the second pole piece layer in the openings of the first and second photoresist layers;
        before making the second pole piece layer, forming a first pole piece layer with a yoke portion located between a pole tip portion and a back gap portion;
        forming a nonmagnetic write gap layer on the pole tip portion of the first pole piece layer;
        forming an insulation stack with at least one coil layer embedded therein on the yoke portion of the first pole piece layer; and
        the plating of the second pole piece layer forming the pole tip portion of the second pole piece layer on the write gap layer, the yoke portion of the second pole piece layer on the insulation stack and the back gap portion of the second pole piece layer on the back gap portion of the first pole piece layer.

3. A method as claimed in claim 2 wherein the first bandwidth of light is a low bandwidth of light and the second bandwidth of light is a high bandwidth of light that is higher than the low bandwidth of light.

4. A method as claimed in claim 3 wherein the low bandwidth of light excludes wavelengths greater than substantially 400 nm.

5. A method as claimed in claim 2 including:
    each of the first and second photoresist layers being a positive photoresist layer wherein areas to be removed by developing are exposed to said light.

6. A method as claimed in claim 2 wherein before photopatterning the second and first photoresist layers the second photoresist layer is thicker than the first photoresist layer in the pole tip region.

7. A method as claimed in claim 6 wherein the first bandwidth of light is a low bandwidth of light and the second bandwidth of light is a high bandwidth of light that is higher than the low bandwidth of light.

8. A method as claimed in claim 7 including:
    each of the first and second photoresist layers being a positive photoresist layer wherein areas to be removed by developing are exposed to said light.

9. A method as claimed in claim 8 wherein the low bandwidth of light excludes wavelengths greater than substantially 400 nm.

10. A method of making a magnetic write head that includes a second pole piece layer wherein the second pole piece layer has a yoke portion between a pole tip portion and a back gap portion comprising the steps of:
    a making of the second pole piece layer comprising the steps of:

forming a first photoresist layer that is sensitive to light with wavelengths within a first bandwidth;

forming on the first photoresist layer a second photoresist layer that is sensitive to light with wavelengths within a second bandwidth which is at least partially different from said first bandwidth;

exposing the second photoresist layer to wavelengths of light within a third bandwidth at yoke, back gap and field sites wherein the yoke and back gap sites define a perimeter of said yoke and back gap portions and the field site includes at least a pole tip site for said pole tip portion;

said third bandwidth including at least a portion of the wavelengths of light from the second bandwidth but excluding wavelengths of light from the first bandwidth;

developing the second photoresist layer so that the second photoresist layer has a yoke and back gap opening at yoke and back gap sites for said yoke and back gap portions of the second pole piece layer and has at least a pole tip opening at said pole tip site for said pole tip portion;

exposing the first photoresist layer to wavelengths of light within a fourth bandwidth at yoke, back gap and pole tip sites for defining a perimeter that defines the yoke, back gap and pole tip portions of the second pole piece layer;

said fourth bandwidth including at least a portion of said first bandwidth;

developing the first photoresist layer so that the first and second photoresist layers have openings defining the yoke and back gap portions of the second pole piece layer and the first photoresist layer has an opening defining said pole tip portion of the second pole piece layer;

plating the second pole piece layer with the yoke, back gap and pole tip portions in the yoke, back gap and pole tip openings of the first and second photoresist layers; and removing the first and second photoresist layers.

11. A method as claimed in claim 10 further comprising the steps of:

before making the second pole piece layer, forming a first pole piece layer with a yoke portion located between a pole tip portion and a back gap portion;

forming a nonmagnetic write gap layer on the pole tip portion of the first pole piece layer;

forming an insulation stack with at least one coil layer embedded therein on the yoke portion of the first pole piece layer;

the plating of the second pole piece layer forming the pole tip portion of the second pole piece layer on the write gap layer, the yoke portion of the second pole piece layer on the insulation stack and the back gap portion of the second pole piece layer on the back gap portion of the first pole piece layer.

12. A method as claimed in claim 11 wherein before exposing the second photoresist layer to light the second photoresist layer is thicker than the first photoresist layer in the pole tip region.

13. A method as claimed in claim 12 wherein the field site exposed to wavelengths of light in the third bandwidth and developed encompasses the second photoresist layer and the second photoresist layer has an opening at only said yoke and back gap sites.

14. A method as claimed in claim 13 wherein the first bandwidth of light is a low bandwidth of light and the second bandwidth of light includes a high bandwidth of light that is higher than the low bandwidth of light.

15. A method of making multiple magnetic write heads wherein each magnetic write head includes a second pole piece layer that has a yoke portion between a pole tip portion and a back gap portion comprising the steps of:

providing a wafer that has rows and columns of write head sites;

forming a ferromagnetic first pole piece layer at each write head site that has a yoke portion located between a pole tip portion and a back gap portion;

forming a nonmagnetic nonconductive write gap layer on each pole tip portion;

forming an insulation stack with at least one coil embedded therein on each yoke portion; a making of the second pole piece layer at each write head site comprising the steps of:

forming a seed layer on the wafer covering the write head site;

forming a first photoresist layer on the wafer that is sensitive to light with wavelengths within a first bandwidth;

forming on the first photoresist layer a second photoresist layer that is sensitive to light with wavelengths within a second bandwidth which is at least partially different from said first bandwidth;

exposing the second photoresist layer to wavelengths of light within a third bandwidth at yoke, back gap and field sites wherein the yoke and back gap sites define a perimeter of said yoke and back gap portions and the field site includes at least a pole tip site for said pole tip portion;

said third bandwidth including at least a portion of the wavelengths of light from the second bandwidth but excluding wavelengths of light from the first bandwidth;

developing the second photoresist layer so that the second photoresist layer has a yoke and back gap opening at yoke and back gap sites for said yoke and back gap portions and has at least a pole tip opening at said pole tip site for said pole tip portion;

exposing the first photoresist layer to wavelengths of light within a fourth bandwidth at yoke, back gap and pole tip sites for defining a perimeter that defines the yoke, back gap and pole tip portion wherein the fourth bandwidth includes at least a portion of said first bandwidth;

developing the first photoresist layer so that the first and second photoresist layers have openings defining the yoke and back gap portions and the first photoresist layer has an opening defining said pole tip portion;

plating the second pole piece layer with the yoke, back gap and pole tip portions in the yoke, back gap and pole tip openings of the first and second photoresist layers; and removing the first and second photoresist layers; and removing the seed layer where exposed;

forming an over coat layer on the substrate over each write head site;

dicing the wafer and layers thereon into rows of partially completed write heads;

lapping the rows of write heads to form each partially completed write head with an air bearing surface (ABS); and dicing the rows of partially completed write heads into individually completed write heads.

16. A method as claimed in claim 15 further comprising the steps of:
- before making the second pole piece layer, forming a first pole piece layer with a yoke portion located between a pole tip portion and a back gap portion;
- forming a nonmagnetic write gap layer on the pole tip portion of the first pole piece layer;
- forming an insulation stack with at least one coil layer embedded therein on the yoke portion of the first pole piece layer;
- the plating of the second pole piece layer forming the pole tip portion of the second pole piece layer on the write gap layer, the yoke portion of the second pole piece layer on the insulation stack and the back gap portion of the second pole piece layer on the back gap portion of the first pole piece layer.

17. A method as claimed in claim 16 wherein before exposing the second photoresist layer to light the second photoresist layer is thicker than the first photoresist layer in the pole tip region.

18. A method as claimed in claim 17 wherein the field site exposed to wavelengths of light in the third bandwidth and developed encompasses the second photoresist layer and the second photoresist layer has an opening at only said yoke and back gap sites.

19. A method as claimed in claim 18 wherein the first bandwidth of light is a low bandwidth of light and the second bandwidth of light includes a high bandwidth of light that is higher than the low bandwidth of light.

* * * * *